(12) United States Patent
Li et al.

(10) Patent No.: US 11,352,271 B2
(45) Date of Patent: Jun. 7, 2022

(54) METHOD AND DEVICE FOR SEWAGE TREATMENT

(71) Applicant: Central South University, Changsha (CN)

(72) Inventors: Haipu Li, Changsha (CN); Jingjing Yao, Changsha (CN); Zhaoguang Yang, Changsha (CN); Qingqing Dong, Changsha (CN); Ximei Dai, Changsha (CN); Siyuan Pan, Changsha (CN); Nadi Yuan, Changsha (CN)

(73) Assignee: Central South University, Changsha (CN)

( * ) Notice: Subject to any disclaimer, the term of this patent is extended or adjusted under 35 U.S.C. 154(b) by 187 days.

(21) Appl. No.: 16/578,119

(22) Filed: Sep. 20, 2019

(65) Prior Publication Data

US 2020/0024162 A1 Jan. 23, 2020

(51) Int. Cl.
*C02F 1/467* (2006.01)
*C02F 1/461* (2006.01)

(52) U.S. Cl.
CPC ........ *C02F 1/46109* (2013.01); *C02F 1/4672* (2013.01); *C02F 2001/46142* (2013.01); *C02F 2001/46166* (2013.01); *C02F 2201/009* (2013.01); *C02F 2201/4614* (2013.01); *C02F 2201/46145* (2013.01); *C02F 2201/46165* (2013.01); *C02F 2201/782* (2013.01); *C02F 2209/40* (2013.01); *C02F 2305/023* (2013.01); *C02F 2305/026* (2013.01)

(58) Field of Classification Search
None
See application file for complete search history.

(56) References Cited

U.S. PATENT DOCUMENTS

2019/0389756 A1* 12/2019 Huang ................ B01F 3/04978

FOREIGN PATENT DOCUMENTS

CN 105693017 A * 6/2016

* cited by examiner

*Primary Examiner* — Brad Gordon
(74) *Attorney, Agent, or Firm* — CBM Patent Consulting, LLC (57) ABSTRACT

A device for sewage treatment comprises a treatment tank, a power and electric control unit, a gas supply and tail gas recovery unit and a circular reaction treatment unit; the treatment tank is provided with a liquid inlet, a liquid outlet, a gas intake port and a tail gas exhaust port; the gas supply and tail gas recovery unit is communicated with the treatment tank through the gas intake port; the tail gas exhaust port is communicated with the gas supply and tail gas recovery unit; the circular reaction treatment unit comprises an external circulating device and a reaction treatment element arranged inside the treatment tank.

7 Claims, 7 Drawing Sheets

METHOD AND DEVICE FOR SEWAGE TREATMENT

This application claims priority to Chinese Patent Application Ser. No CN201910564320.2 and CN201920980393.5 filed on Mar. 28, 2019.

TECHNICAL FIELD

The present invention belongs to the field of advanced sewage treatment, and relates to a device and method for sewage treatment, and more particularly, to a device for sewage treatment which modifies electrocatalytic ozone and ferrate of an electrochemical cathode under a self-circulation system, and a method for treating domestic sewage and/or laboratory organic wastewater by applying the device for sewage treatment

BACKGROUND

Traditional devices for sewage treatment are generally set according to functions, which have various types and cover a large area, and different units require different personnel and maintenance methods, resulting in the problems of difficult overall control, decentralized management and large capital consumption. The water treatment technologies are developed continuously towards scientific, green and energy-conservation orientations.

The current water treatment technologies have various steps and a long processing period; removing by-products using a single ozone process usually cause secondary pollution; a biological sludge aeration method has high requirements on the site, and cannot effectively control and treat pungent odors such as stench, stink and ammonia odor; reverse osmosis and other materials have higher costs, and later maintenance costs are expensive; and the emerging pollutants cannot be completely removed by the prior art.

An electrocatalytic ozone system electrolyzes ozone in water to generate hydroxyl radicals with strong oxidation ability, which can oxidize and degrade most organic pollutants into inorganic substances, and the electrocatalytic ozone system has a series of advantages, such as good degradation effect, low energy consumption, cleanness and no secondary pollutants, etc. A ferrate is used as a water treatment reagent which integrates oxidation, flocculation, adsorption and other functions, and a reduced substance is harmless to the environment. As a water treatment reagent integrating oxidation, flocculation, adsorption and other functions, a substance reduced by the ferrate is harmless to the environment. Therefore, the ferrate is usually used as an advanced oxidation technology and applied to the removal processes of organic and inorganic pollutants. Moreover, the ferrate is simple to add and has remarkable effects. The application of a system for generating hydrogen peroxide in situ by electrocatalysis to couple with ferrate is still in an exploratory stage, and has attracted more and more attention due to the excellent coupling effect.

Different processes may be used to prepare ferrites with different structures, among which a cubic phase structure and a hexagonal phase structure are common, and different structures correspond to different performances. The mature and widely used ferrites at current mainly include $CoFe_2O_4$, $CuFe_2O_4$, $MnFe_2O_4$, etc., which has the general characteristics of strong catalysis, low solubility, stable crystal structure, easy magnetic separation from water, and other properties. An electrode is an important component of the electrocatalytic ozone system. A carbonized MOF material has a developed three-dimensional pore structure, the ferrite is loaded in a pore channel of the carbonized MOF material, and a new material obtained by loading the ferrite in the pore channel of the carbonized MOF material is used for preparing a novel electrochemical cathode.

SUMMARY

In order to solve the technical problems above in the background art, the present invention provides a device and method for sewage treatment, which can deeply degrade domestic sewage/laboratory organic wastewater, can realize secondary utilization of the domestic wastewater, have a high effluent quality and realize harmless discharge.

In order to achieve the objects above, the following technical solutions are employed in the present invention.

A device for sewage treatment comprises a treatment tank, a power and electric control unit, a gas supply and tail gas recovery unit and a circular reaction treatment unit, wherein the treatment tank is provided with a liquid inlet, a liquid outlet, a gas intake port and a tail gas exhaust port; the gas supply and tail gas recovery unit is communicated with the treatment tank through the gas intake port; the tail gas exhaust port is communicated with the gas supply and tail gas recovery unit; the circular reaction treatment unit comprises an external circulating device and a reaction treatment element; the reaction treatment element is arranged inside the treatment tank; the external circulating device is arranged outside the treatment tank and is communicated with the liquid inlet and the liquid outlet respectively; the power and electric control unit is connected with the reaction treatment element; and sewage to be processed enters the treatment tank through the liquid inlet and reacts with the reaction treatment element.

Preferably, the reaction treatment element used in the present invention comprises a micro-nano aeration disk, an electrochemical cathode, a three-dimensional particle electrode and an electrochemical anode; the micro-nano aeration disk, the electrochemical cathode, the three-dimensional particle electrode and the electrochemical anode are arranged in the treatment tank from front to back in sequence; the power and electric control unit is respectively connected with the electrochemical cathode and the electrochemical anode; the gas intake port is communicated with the treatment tank and is connected with the micro-nano aeration disk; and a persulfate layer is filled between the electrochemical cathode and the electrochemical anode.

Preferably, the electrochemical cathode used in the present invention is a ferrite-modified Mxene layered gas diffusion electrode, a ferrite-modified carbon fiber cloth electrochemical cathode and/or a carbonized MOFs electrochemical cathode; the three-dimensional particle electrode is an electrode formed by an in-situ growing MOFs nano-material of a magnetic carbon material; and the electrochemical anode is a stainless steel mesh electrode, a platinum mesh electrode and/or a titanium mesh electrode.

Preferably, when the electrochemical cathode used in the present invention is the ferrite-modified Mxene layered gas diffusion electrode, a preparation method of the ferrite-modified Mxene layered gas diffusion electrode comprises the following steps of:

1) preparation of Mxene material: soaking a MAX phase material in a HF water solution, drying, washing and centrifuging the mixture, removing surface residue impurities, and drying until a constant mass is reached to obtain the Mxene material;

2) modification of MXene material by ferrite: adding the MXene material obtained in the step 1) into a ferrite, and ultrasonically processing, filtering and washing the mixture to neutrality; and then roasting and cooling the mixture to obtain a ferrite-modified MXene material for later use; and 3) preparation of layered gas diffusion electrode: ultrasonically processing a mixture of the ferrite-modified MXene material obtained in the step 2) with a conductive agent, a pore-forming agent, a binder and absolute ethyl alcohol, stirring the mixture in a constant-temperature water bath until the mixture is pasty, taking out the pasty gel and placing the pasty gel on an axial press to repeatedly and axially press the pasty gel into a sheet, wrapping the sheet on foam nickel to continuously and axially press the sheet until the sheet contains no water, then rolling the sheet by a roller machine to obtain an electrode, placing the rolled electrode in a constant-temperature drying oven for drying, pressing and forming the electrode under a pressure of 10 MPa to 20 MPa, then placing the electrode in a tubular furnace to roast under an inert gas condition, finally soaking the electrode in boiling water, and taking out and drying the electrode to obtain the ferrite-modified MXene layered gas diffusion electrode;

when the electrochemical cathode is the ferrite-modified carbon fiber cloth electrochemical cathode, a preparation method of the ferrite-modified carbon fiber cloth electrochemical cathode comprises the following steps of:

1) preparation of modified carbon fiber cloth: completely soaking carbon fiber cloth in a solution with strong oxidation, ultrasonically processing the mixture, then placing the carbon fiber cloth in a constant-temperature reaction kettle for reaction, washing surface residue impurities with water until a pH value is neutral, and drying the carbon fiber cloth in a vacuum oven to obtain the modified carbon fiber cloth; and 2) preparation of ferrite-modified carbon fiber cloth: adding a salt containing $Fe^{3+}$ and a divalent metal salt into ultra-pure water, stirring the mixture with a magnetic stirrer to evenly mix and completely dissolve the mixture to obtain a mixed solution, adding the modified carbon fiber cloth, and adding polyethylene glycol or a composition of ammonium fluoride and urea into the mixture to continuously stir, then placing the mixture in a constant-temperature reaction kettle for reaction, cooling the mixture after reaction, washing the mixture, placing the mixture in a constant-temperature drying oven for drying, then placing the mixture in a tubular electric furnace, introducing inert gas as protective gas, and roasting the mixture to obtain the ferrite-modified carbon fiber cloth;

when the electrochemical cathode is the carbonized MOFs electrochemical cathode, a preparation method of the carbonized MOFs electrochemical cathode comprises the following steps of:

1) centrifugally separating a metal organic framework compound MOFs adsorbed with a metal ion or an organic matter, placing the metal organic framework compound MOFs in a tubular electric furnace, roasting the metal organic framework compound MOFs at a high temperature under the protection of inert gas, and grinding the metal organic framework compound MOFs after cooling to obtain a carbonized MOFs material; and 2) ultrasonically processing a mixture of the carbonized MOFs material prepared in the step 1) with a conductive agent, a pore-forming agent and absolute ethyl alcohol or polyethylene glycol, and adding a binder to stir the mixture into a rubber-like mixture in a constant-temperature water bath; and wrapping the rubber-like mixture on foam nickel, adding ethanol to press and form, roasting the mixture under the protection of the inert gas, then washing the mixture with water at 80° C. to 100° C., and naturally withering the mixture to obtain the carbonized MOFs electrochemical cathode; and a preparation method of the in-situ growing MOFs nano-material of the magnetic carbon material adopted in the three-dimensional particle electrode comprises the following steps of:

1) preparing a magnetic nano-material into a magnetic nano-material water solution, adding a carbonized material into the magnetic nano-material water solution and ultrasonically processing and evenly mixing the mixture to obtain a mixed solution;

2) reacting the mixed solution prepared in the step 1) in a constant-temperature magnetic stirrer at 40° C. to 60° C. for no less than 24 h at a rotating speed of 3 rpm;

3) cooling the solution obtained in the step 2) to a room temperature, filtering the solution through qualitative filter paper, and washing a filter cake until a last filter liquid is neutral to obtain an adsorbent washed to neutrality;

4) placing the adsorbent washed to neutrality prepared in the step 3) in an electric heating constant-temperature drying oven at 40° C. to 60° C. to dry for no less than 12 h, and grinding the adsorbent to powder;

5) placing the powdery adsorbent obtained in the step 4) into a quartz crucible without a cover, evenly spreading the powdery adsorbent, then placing the powdery adsorbent in a vacuum tubular electric furnace with $N_2$ as a protective gas flow, heating the powdery adsorbent to 600° C. at a heating rate of 4° C./min to 6° C./min and keeping the constant temperature for 2 h, and grinding the powdery adsorbent after cooling to obtain a magnetic carbon material; the carbonized material being a combination of one or more of a multi-walled carbon nanotube, graphene and biochar; and the magnetic nano-material being a spinel ferrite formed by zero-valent iron, $\gamma\text{-}Fe_2O_3$ or a hydrothermal synthesis method; and 6) ultrasonically and evenly dispersing the magnetic carbon material prepared in the step 5) in ultra-pure water, adding a transition metal salt to completely dissolve the magnetic carbon material, then adding an organic ligand to the magnetic carbon material, transferring the mixture to a high-pressure reaction kettle for reaction after sealing and stirring, taking out a solid-liquid mixture in the high-pressure reaction kettle after the reaction is finished, cleaning the solid-liquid mixture with the ultra-pure water, then sealing, stirring and centrifuging the solid-liquid mixture, cleaning centrifuged solids with absolute ethyl alcohol, and drying to obtain the in-situ growing MOFs nano-material of the magnetic carbon material.

Preferably, a mass ratio of the ferrite to the MXene material in the ferrite-modified MXene layered gas diffusion electrode used in the present invention is 1:3 to 1:9; a mass sum of the ferrite and the MXene material is 19% to 45% of a mass of the ferrite-modified MXene layered gas diffusion electrode; a mass ratio of the ferrite to the modified carbon fiber cloth material in the ferrite-modified carbon fiber cloth electrochemical cathode is 1:2 to 1:8; the solution with strong oxidation is one or more of concentrated nitric acid, concentrated sulfuric acid, oxyacids of chlorine, bromine and iodine, a Fenton reagent, a persulfate solution and a potassium ferrate solution; the divalent metal is one or more of $Fe^{2+}$, $Mn^{2+}$, $Ni^{2+}$, $Cu^{2+}$ and $Co^{2+}$; the carbonized MOFs electrochemical cathode has a thickness of 1 mm to 3 mm; under the condition of introducing oxygen, 10 mg/L to 20 mg/L of $H_2O_2$ can be generated in situ per minute; the organic ligand of the in-situ growing MOFs nano-material of the magnetic carbon material is any one of pyromellitic acid and terephthalic acid; the metal salt and the organic ligand form the in-situ growing MOFs; and the in-situ growing MOFs is adsorbed on the magnetic carbon material.

Preferably, the micro-nano aeration disk used in the present invention discharges micro-nano bubbles; the micro-nano bubble has a size of 200 nm to 500 nm; the in-situ growing MOFs nano-material of the magnetic carbon material in the three-dimensional particle electrode has a particle size of 20 nm to 200 nm, a specific surface area of 50 $m^2/g$ to 300 $m^2/g$, a pore volume of 0.5 $cm^3/g$ to 1.5 $cm^3/g$, and a saturation magnetization of 5 emu/g to 25 emu/g.

Preferably, the external circulating device used in the present invention comprises a liquid flowmeter and a peristaltic pump; the peristaltic pump is communicated with the liquid inlet on the treatment tank through the liquid flowmeter; and the liquid outlet on the treatment tank is communicated with the peristaltic pump.

Preferably, the gas supply and tail gas recovery unit used in the present invention comprises an oxygen carrier, an ozone generator, a tail gas exhaust valve and a tail gas absorption device;

the oxygen carrier is communicated with the treatment tank through the ozone generator and the gas intake port in sequence; the oxygen carrier is communicated with the treatment tank through the gas intake port; and the tail gas exhaust port is communicated with the tail gas absorption device through the tail gas exhaust valve.

Preferably, the power and electric control unit used in the present invention comprises a wind power generator, a solar panel, a UPS power supply, a constant current meter, a first electrode switch and a second electrode switch; the wind power generator is connected with the UPS power supply through the solar panel; the UPS power supply is respectively connected with the first electrode switch and the second electrode switch through the constant current meter; and the first electrode switch and the second electrode switch are respectively connected with the reaction treatment element arranged inside the treatment tank.

A method for sewage treatment based on the device for sewage treatment above comprises the following steps of:

1) preliminarily removing impurities in domestic sewage/laboratory organic wastewater through coarse and fine sieves; and 2) transferring the sewage into the treatment tank through the liquid inlet, starting the peristaltic pump to circulate the sewage in the treatment tank, generating ozone from an air source or an oxygen source through the ozone generator, forming nano-bubbles after the ozone passes through the micro-nano aeration disk, the nano-bubbles entering the three-dimensional particle electrode after passing through the electrochemical cathode at a certain speed, and switching on the electrode switch to purify the sewage inside the treatment tank; discharging the processed sewage through the liquid outlet on the treatment tank after the sewage is purified, the tail gas entering the tail gas treatment device during purification.

The present invention has the beneficial effects as follow.

The device for sewage treatment of the present invention has the advantages of simple operation, excellent circular treatment efficiency, simple device structure, abundant electrode material sources, small covering area of reaction device, capability of realizing high-efficiency purification of sewage in different places, simple maintenance, lower operation costs, less by-products to be disinfected after treatment and high effluent quality. Specifically, compared with the prior art, the present invention has the following beneficial effects.

1) By utilizing different physical properties of the sewage, different advanced oxidation systems are selected to meet the water quality requirements that cannot be met by a single process or a common process, so that the present invention is especially suitable for organic wastewater with a high concentration and complex components in laboratory and has a broad market prospect.

2) As a novel advanced oxidation technology, the electrocatalytic ozone coupling technology by the modified electrochemical cathode has multiple advantages such as high treatment efficiency, low energy consumption, etc. The reaction device is detachable and covers a small area, and has no requirements on operation site, is simple to prepare and maintain, and has a stable electrode property. Meanwhile, the ferrite, the modified carbon fiber cloth, the MXene and the carbonized MOFs are introduced and used in combination according to the pollutant properties, which have high-efficiency catalytic performances, greatly improve the ability of the system to generate the hydroxyl radical, and have a wide application range and a high water quality mineralization degree.

3) The modified electrochemical cathode may be simultaneously applied to the water treatment systems such as ferrate, electrocatalytic ozone, etc., and a plurality of micro-electrode systems are formed by means of the three-dimensional particle electrodes, which realizes the efficient degradation of sewage, and is particularly suitable for high Chemical Oxygen Demand (COD) and Biochemical Oxygen Demand (BOD) systems.

4) The nano-bubbles can efficiently pass through the modified electrochemical cathode and fully react in a gas diffusion channel, which improves the yield of the hydrogen peroxide and the utilization rate of the liquid phase ozone.

5) The self-circulation system accelerates gas-liquid mass transfer, so that the gas and the liquid are fully convected, which improves the utilization rate of the ozone, and sufficiently degrades the sewage pollutants in an active area of the electrode, and can adjust a hydraulic retention time of the sewage between the electrodes by adjusting the rotating speed of the peristaltic pump.

1 refers to wind power generator; 2 refers to solar panel; 3 refers to UPS power supply; 4 refers to constant current meter; 5 refers to first electrode switch; 6 refers to second electrode switch; 7 refers to third electrode switch; 8 refers to ozone exhaust port; 9 refers to air or oxygen intake port; 10 refers to ozone generator; 11 refers to oxygen carrier; 12 refers to first gas flowmeter; 13 refers to first electromagnetic valve; 14 refers to second gas flowmeter; 15 refers to third gas flowmeter; 16 refers to second electromagnetic valve; 17 refers to third electromagnetic valve; 18 refers to liquid outlet; 19 refers to first micro-nano aeration disk; 20 refers to nano-bubbles; 21 refers to first modified electrochemical cathode; 22 refers to three-dimensional particle electrode; 23 refers to first ferrate adding port; 24 refers to electrochemical anode; 25 refers to tail gas exhaust valve; 26 refers to tail gas absorption device; 27 refers to second ferrate adding port; 28 refers to second modified electrochemical cathode; 29 refers to second micro-nano aeration disk; 30 refers to liquid inlet; 31 refers to liquid flowmeter; and 32 refers to peristaltic pump.

DETAILED DESCRIPTION

Figure 1:
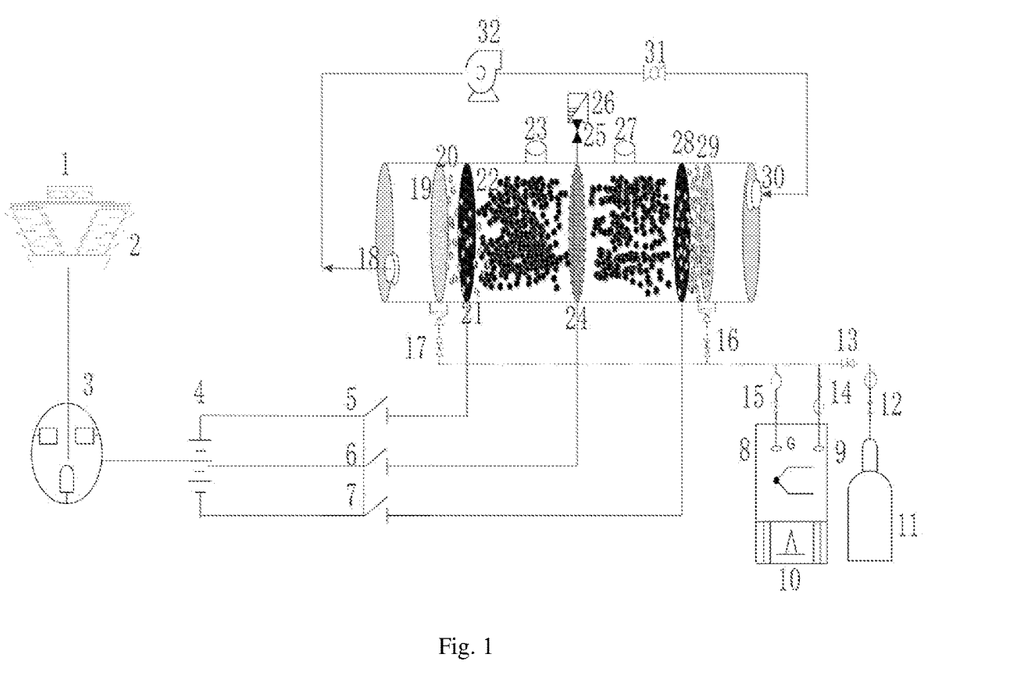
FIG. 1 is a structure diagram of a device for sewage treatment provided by the present invention.

As shown in FIG. 1, the device for sewage treatment comprises a power and electric control unit, a gas supply and tail gas recovery unit and a circular reaction treatment unit, and an electrocatalytic ozone system and/or a potassium ferrate system may be used.

The present invention provides a device for sewage treatment, which comprises a treatment tank, a power and electric control unit, a gas supply and tail gas recovery unit and a circular reaction treatment unit. The treatment tank is provided with a liquid inlet 30, a liquid outlet 18, a gas intake port and a tail gas exhaust port. The gas supply and tail gas recovery unit is communicated with the treatment tank through the gas intake port. The tail gas exhaust port is communicated with the gas supply and tail gas recovery unit; the circular reaction treatment unit comprises an external circulating device and a reaction treatment element. The reaction treatment element is arranged inside the treatment tank. The external circulating device is arranged outside the treatment tank and is communicated with the liquid inlet 30 and the liquid outlet 18 respectively. The power and electric control unit is connected with the reaction treatment element; and sewage to be processed enters the treatment tank through the liquid inlet 30 and reacts with the reaction treatment element.

The reaction treatment element comprises a micro-nano aeration disk, an electrochemical cathode, a three-dimensional particle electrode and an electrochemical anode. The micro-nano aeration disk, the electrochemical cathode, the three-dimensional particle electrode and the electrochemical anode are arranged in the treatment tank from front to back in sequence. The power and electric control unit is respectively connected with the electrochemical cathode and the electrochemical anode. The gas intake port is communicated with the treatment tank and is connected with the micro-nano aeration disk. A persulfate layer is filled between the electrochemical cathode and the electrochemical anode.

The electrochemical cathode is a ferrite-modified Mxene layered gas diffusion electrode, a ferrite-modified carbon fiber cloth electrochemical cathode and/or a carbonized MOFs electrochemical cathode. The three-dimensional particle electrode is an electrode formed by an in-situ growing MOFs nano-material of a magnetic carbon material. The electrochemical anode is a stainless steel mesh electrode, a platinum mesh electrode and/or a titanium mesh electrode.

When the electrochemical cathode is the ferrite-modified Mxene layered gas diffusion electrode, a preparation method of the ferrite-modified Mxene layered gas diffusion electrode comprises the following steps of:

1) preparation of Mxene material: soaking a MAX phase material in a HF water solution, drying, washing and centrifuging the mixture, removing surface residue impurities, and drying until a constant mass is reached to obtain the Mxene material;

2) modification of MXene material by ferrite: adding the MXene material obtained in the step 1) into a ferrite, and ultrasonically processing, filtering and washing the mixture to neutrality; and then roasting and cooling the mixture to obtain a ferrite-modified MXene material for later use; and 3) preparation of layered gas diffusion electrode: ultrasonically processing a mixture of the ferrite-modified MXene material obtained in the step 2) with a conductive agent, a pore-forming agent, a binder and absolute ethyl alcohol, stirring the mixture in a constant-temperature water bath until the mixture is pasty, taking out the pasty gel and placing the pasty gel on an axial press to repeatedly and axially press the pasty gel into a sheet, wrapping the sheet on foam nickel to continuously and axially press the sheet until the sheet contains no water, then rolling the sheet by a roller machine to obtain an electrode, placing the rolled electrode in a constant-temperature drying oven for drying, pressing and forming the electrode under a pressure of 10 MPa to 20 MPa, then placing the electrode in a tubular furnace to roast under an inert gas condition, finally soaking the electrode in boiling water, and taking out and drying the electrode to obtain the ferrite-modified MXene layered gas diffusion electrode;

when the electrochemical cathode is the ferrite-modified carbon fiber cloth electrochemical cathode, a preparation method of the ferrite-modified carbon fiber cloth electrochemical cathode comprises the following steps of:

1) preparation of modified carbon fiber cloth: completely soaking carbon fiber cloth in a solution with strong oxidation, ultrasonically processing the mixture, then placing the carbon fiber cloth in a constant-temperature reaction kettle for reaction, washing surface residue impurities with water until a pH is neutral, and drying the carbon fiber cloth in a vacuum oven to obtain the modified carbon fiber cloth; and 2) preparation of ferrite-modified carbon fiber cloth: adding a salt containing $Fe^{3+}$ and a divalent metal salt into ultra-pure water, stirring the mixture with a magnetic stirrer to evenly mix and completely dissolve the mixture to obtain a mixed solution, adding the modified carbon fiber cloth, and adding polyethylene glycol or a composition of ammonium fluoride and urea into the mixture to continuously stir, then placing the mixture in a constant-temperature reaction kettle for reaction, cooling the mixture after reaction, washing the mixture, placing the mixture in a constant-temperature drying oven for drying, then placing the mixture in a tubular electric furnace, introducing inert gas as protective gas, and roasting the mixture to obtain the ferrite-modified carbon fiber cloth;

when the electrochemical cathode is the carbonized MOFs electrochemical cathode, a preparation method of the carbonized MOFs electrochemical cathode comprises the following steps of:

1) centrifugally separating a metal organic framework compound MOFs adsorbed with a metal ion or an organic matter, placing the metal organic framework compound MOFs in a tubular electric furnace, roasting the metal organic framework compound MOFs at a high temperature under the protection of inert gas, and grinding the metal organic framework compound MOFs after cooling to obtain a carbonized MOFs material; and 2) ultrasonically processing a mixture of the carbonized MOFs material prepared in the step 1) with a conductive agent, a pore-forming agent and absolute ethyl alcohol or polyethylene glycol, and adding a binder to stir the mixture into a rubber-like mixture in a constant-temperature water bath; and wrapping the rubber-like mixture on foam nickel, adding ethanol to press and form, roasting the mixture under the protection of the inert gas, then washing the mixture with water at 80° C. to 100° C., and naturally withering the mixture to obtain the carbonized MOFs electrochemical cathode; and a preparation method of the in-situ growing MOFs nano-material of the magnetic carbon material adopted in the three-dimensional particle electrode comprises the following steps of:

1) preparing a magnetic nano-material into a magnetic nano-material water solution, adding a carbonized material into the magnetic nano-material water solution and ultrasonically processing and evenly mixing the mixture to obtain a mixed solution;

2) reacting the mixed solution prepared in the step 1) in a constant-temperature magnetic stirrer at 40° C. to 60° C. for no less than 24 h at a rotating speed of 3 rpm;

3) cooling the solution obtained in the step 2) to a room temperature, filtering the solution through qualitative filter paper, and washing a filter cake until a last filter liquid is neutral to obtain an adsorbent washed to neutrality;

4) placing the adsorbent washed to neutrality prepared in the step 3) in an electric heating constant-temperature drying oven at 40° C. to 60° C. to dry for no less than 12 h, and grinding the adsorbent to powder;

5) placing the powdery adsorbent obtained in the step 4) into a quartz crucible without a cover, evenly spreading the powdery adsorbent, then placing the powdery adsorbent in a vacuum tubular electric furnace with $N_2$ as a protective gas flow, heating the powdery adsorbent to 600° C. at a heating rate of 4° C./min to 6° C./min and keeping the constant temperature for 2 h, and grinding the powdery adsorbent after cooling to obtain a magnetic carbon material; the carbonized material being a combination of one or more of a multi-walled carbon nanotube, graphene and biochar; and the magnetic nano-material being a spinel ferrite formed by zero-valent iron, $\gamma$-$Fe_2O_3$ or a hydrothermal synthesis method; and 6) ultrasonically and evenly dispersing the magnetic carbon material prepared in the step 5) in ultra-pure water, adding a transition metal salt to completely dissolve the magnetic carbon material, then adding an organic ligand to the magnetic carbon material, transferring the mixture to a high-pressure reaction kettle for reaction after sealing and stirring, taking out a solid-liquid mixture in the high-pressure reaction kettle after the reaction is finished, cleaning the solid-liquid mixture with the ultra-pure water, then sealing, stirring and centrifuging the solid-liquid mixture, cleaning centrifuged solids with absolute ethyl alcohol, and drying to obtain the in-situ growing MOFs nano-material of the magnetic carbon material.

A mass ratio of the ferrite to the MXene material in the ferrite-modified MXene layered gas diffusion electrode is 1:3 to 1:9; a mass sum of the ferrite and the MXene material is 19% to 45% of a mass of the ferrite-modified MXene layered gas diffusion electrode; a mass ratio of the ferrite to the modified carbon fiber cloth material in the ferrite-modified carbon fiber cloth electrochemical cathode is 1:2 to 1:8. The solution with strong oxidation is one or more of concentrated nitric acid, concentrated sulfuric acid, oxyacids of chlorine, bromine and iodine, a Fenton reagent, a persulfate solution and a potassium ferrate solution. The divalent metal is one or more of $Fe^{2+}$, $Mn^{2+}$, $Ni^{2+}$, $Cu^{2+}$ and $Co^{2+}$. The carbonized MOFs electrochemical cathode has a thickness of 1 mm to 3 mm. Under the condition of introducing oxygen, 10 mg/L to 20 mg/L of $H_2O_2$ can be generated in situ per minute. The organic ligand of the in-situ growing MOFs nano-material of the magnetic carbon material is any one of pyromellitic acid and terephthalic acid. The metal salt and the organic ligand form the in-situ growing MOFs. The in-situ growing MOFs are adsorbed on the magnetic carbon material.

The micro-nano aeration disk discharges micro-nano bubbles; and the micro-nano bubble has a size of 200 nm to 500 nm, which is beneficial to the increase of the concentration of dissolved oxygen or/and liquid phase ozone in the solution. The in-situ growing MOFs nano-material of the magnetic carbon material in the three-dimensional particle electrode has a particle size of 20 nm to 200 nm, a specific surface area of 50 $m^2$/g to 300 $m^2$/g, a pore volume of 0.5 $cm^3$/g to 1.5 $cm^3$/g, and a saturation magnetization of 5 emu/g to 25 emu/g. The external circulating device comprises a liquid flowmeter 31 and a peristaltic pump 32; the peristaltic pump 32 is communicated with the liquid inlet 30 on the treatment tank through the liquid flowmeter 31; and the liquid outlet 18 on the treatment tank is communicated with the peristaltic pump 32. The gas supply and tail gas recovery unit comprises an oxygen carrier 11, an ozone generator 10, a tail gas exhaust valve 25 and a tail gas absorption device 26. The oxygen carrier 11 is communicated with the treatment tank through the ozone generator 10 and the gas intake port in sequence. The oxygen carrier 11 is communicated with the treatment tank through the gas intake port. The tail gas exhaust port is communicated with the tail gas absorption device 26 through the tail gas exhaust valve 25. The power and electric control unit comprises a wind power generator 1, a solar panel 2, a UPS power supply 3, a constant current meter 4, a first electrode switch 5 and a second electrode switch 6. The wind power generator 1 is connected with the UPS power supply 3 through the solar panel 2. The UPS power supply 3 is respectively connected with the first electrode switch 5 and the second electrode switch 6 through the constant current meter 4. The first electrode switch 5 and the second electrode switch 6 are respectively connected with the reaction treatment element arranged inside the treatment tank.

The present invention further provides a method for sewage treatment based on the device for sewage treatment while providing the device for sewage treatment, and the method comprises the following steps of:

1) preliminarily removing impurities in domestic sewage/laboratory organic wastewater through coarse and fine sieves; and 2) transferring the sewage into the treatment tank through the liquid inlet 30, starting the peristaltic pump 32 to circulate the sewage in the treatment tank, generating ozone from an air source or an oxygen source through the ozone generator 10, forming nano-bubbles 20 after the ozone passes through the micro-nano aeration disk, the nano-bubbles entering the three-dimensional particle electrode after passing through the electrochemical cathode at a certain speed, and switching on the electrode switch to purify the sewage inside the treatment tank; discharging the processed sewage through the liquid outlet 18 on the treatment tank after the sewage is purified, the tail gas entering the tail gas treatment device 26 during purification.

As shown in FIG. 1, the power and electric control unit comprises a wind power generator 1, a solar panel 2, a UPS power supply 3, a constant current meter 4, a first electrode switch 5, a second electrode switch 6 and a third electrode switch 7. The gas supply and tail gas recovery unit comprises an ozone exhaust port 8, an air or oxygen intake port 9, an ozone generator 10, an oxygen carrier 11, a first gas flowmeter 12, a first electromagnetic valve 13, a second gas flowmeter 14, a third gas flowmeter 15, a second electromagnetic valve 16, a third electromagnetic valve 17, a tail gas exhaust valve 25 and a tail gas absorption device 26. The circular reaction treatment unit comprises a first micro-nano aeration disk 19, nano-bubbles 20, a first modified electrochemical cathode 21, a three-dimensional particle electrode 22, a first ferrate adding port 23, an electrochemical anode 24, a second ferrate adding port 27, a second modified electrochemical cathode 28, a second micro-nano aeration disk 29, a liquid inlet 30, a liquid flowmeter 31 and a peristaltic pump 32. The gas supply and tail gas recovery unit can provide an air source, a pure oxygen source and ozone as working gases, and when the air source and the pure oxygen source are introduced, the system generates hydrogen peroxide in situ, and forms a coupling degradation system with a potassium ferrate system. The air source and the pure oxygen source may be used as oxygen sources of the ozone generator. When the ozone is introduced, the system may be combined into an electrocatalytic ozone system or/and a potassium ferrate composite system, and tail water is recovered to absorb the ozone.

During specific use of the present invention, the domestic sewage or laboratory organic wastewater is firstly transferred into the reaction device through the liquid inlet 30, the peristaltic pump 32 is started to circulate the sewage in the reaction device, and meanwhile, a proper amount of ferrate is added through the first ferrate adding port 23 and the second ferrate adding port 27. The oxygen source of the first electromagnetic valve 13 is opened to generate ozone through the air or oxygen intake port 9 of the ozone generator 10, the ozone is sent to the second electromagnetic valve 16 and/or the third electromagnetic valve 17 through the ozone exhaust port 8, and passes through the first micro-nano aeration disk 19 or/and the second micro-nano aeration disk 29 to form the nano-bubbles 20, and the nano-bubbles 20 enter the three-dimensional particle electrode 22 system after passing through the first modified electrochemical cathode 21 or/and the second modified electrochemical cathode 28 at a certain speed, and meanwhile, the second electrode switch 6, the first electrode switch 5 or/and the third electrode switch 7 is switched on, and water flow returns to the reaction device again through the liquid inlet 30. The reacted tail gas enters the tail gas treatment device 26 through the tail gas exhaust port 25, and is discharged after treatment.

When the supplied gas is air or oxygen, and a power supply voltage is 1 V to 10 V, the modified electrochemical cathode efficiently generates hydrogen peroxide in situ; and meanwhile, a transition metal ion contained in the three-dimensional particle electrode can generate a hydroxyl radical to deeply oxidize the domestic sewage/laboratory organic wastewater, and the principle is as follows:

$$O_2 + 2H^+ + 2e^- \rightarrow H_2O_2,$$

$$M^n + H_2O_2 \rightarrow M^{n+1} + OH^- + \cdot OH.$$

When the supplied gas is ozone, and the power supply voltage ranges from 4 V to 15 V, the modified electrochemical cathode catalyzes a chain reaction of ozone to generate the hydroxyl radical to deeply oxidize the domestic sewage/laboratory organic wastewater, and the principle is as follows:

$$O_3 + OH^- \rightarrow HO_2^- + O_2,$$

$$O_2 + 2H^+ + 2e^- \rightarrow H_2O_2, \text{ and}$$

$$H_2O_2 + 2O_3 \rightarrow \cdot H + 3O_2.$$

When the ferrate is added, the reaction system performs oxidation, flocculation, adsorption and other actions at the same time to further remove sewage, and the principle is as follows:

oxidation $$E° (FeO_4^{2-}/Fe^{3+}) = 2.20 \text{ V (under acidic condition)}$$

$$E° (FeO_4^{2-}/Fe(OH)_3) = 0.72 \text{ V (under alkaline condition)}$$

flocculation and adsorption $$Fe^{3+} + 3H_2 \rightleftharpoons Fe(OH)_3 + 3H^+.$$

The working principle of the present invention is that: a suitable degradation system is firstly selected by detecting various physical and chemical properties such as pollutant composition, BOD value, COD value, pH value, salinity, etc. of the domestic sewage/laboratory organic wastewater to be processed.

After use, a cleaning solution is 1 mmol/L to 10 mmol/L NaCl solution; after magnetic recovery, the three-dimensional particle electrode is soaked in the cleaning solution for 30 min to 45 min, and the mixture is dried and used continuously; and other electrodes can be cleaned online in the NaCl solution, and the cathode and the anode can be exchanged.

Embodiment 1 of Electrochemical Cathode: Ferrite-Modified Mxene Layered Gas Diffusion Electrode 1) Preparation of MXene material: 3.0 g of $Ti_3AlC_2$ material and 150 mL of hydrofluoric acid solution were added into a round-bottom flask, the mixture was ultrasonically processed for 1 h and reacted for 72 h in a constant-temperature reaction kettle at 40° C., the mixture was washed with ultra-pure water and centrifuged for several times after the solution was cooled, surface residue impurities were removed until a pH of a cleaning solution was not lower than 6, and then the mixture was fully dried in a vacuum oven at 60° C. until a constant mass was reached to obtain the MXene material.

Figure 2:
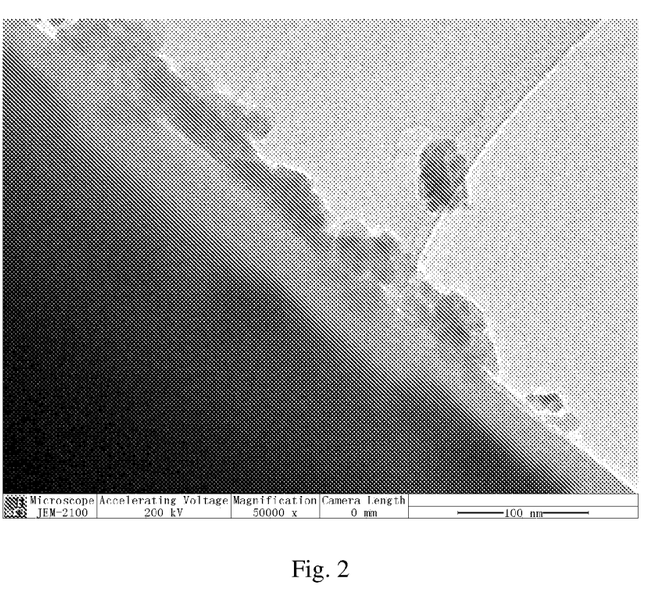
FIG. 2 is a transmission electron microscope of a ferrite used in Embodiment 1.

2) Modification of MXene material by ferrite: 808 mg of $Fe(NO_3)_3 \cdot 9H_2O$ solid and 125.84 mg of $MnCl_2$ solid were accurately taken, the $Fe(NO_3)_3 \cdot 9H_2O$ solid and the $MnCl_2$ solid were added into a certain volume of ultra-pure water, and stirred with a magnetic stirrer to evenly mix and completely dissolve the mixture to obtain a mixed solution, wherein $Fe(NO_3)_3$ was 0.02 mol/L and $MnCl_2$ was 0.01 mol/L, 5 mL of polyethylene glycol was added into the mixed solution to stir for 90 min, and the polyethylene glycol played the role of preventing a size of a ferrite crystal from being too large. 2079 mg of MXene material was added into 100 mL of the mixed solution, and ultrasonically processed for 4 h, then a suspension was placed at a room temperature for 24 h; then the suspension was filtered with a 0.22 μm microporous filter membrane and washed to neutrality; and a washed catalyst was placed in a constant-temperature drying oven at 50° C. for drying, and then placed in a tubular electric furnace, nitrogen gas was introduced as protective gas, and the catalyst was roasted at 600° C. for 3 h, and then cooled and grinded for later use, thus obtaining a modified $Fe_2MnO_4$-MXene material. FIG. 2 is a transmission electron microscope image of a ferrite used in the present invention, which shows that $Fe_2MnO_4$ nanoparticles are in regular crystal morphology and are evenly loaded on a surface of the MXene material, the nanomaterials have a particle size mainly between 10 nm and 50 nm, and the nano-materials on the surface particle have fine particle sizes and are evenly dispersed.

3) Preparation of ferrite-modified Mxene layered gas diffusion electrode: the modified $Fe_2MnO_4$-MXene material (4000 mg), acetylene black and a pore-forming agent ($Na_2SO_4$) were added into a 100 mL beaker, then 20 mL of absolute ethyl alcohol and polytetrafluoroethylene emulsion were added, the mixture was ultrasonically processed for 30 min to mix the mixture evenly, wherein a mass percentage of $Fe_2MnO_4$ in $Fe_2MnO_4$-MXene was 10%, the acetylene black was 2 wt %, the $Na_2SO_4$ was 3 wt %, the PTFE was 50 wt %, and the $Fe_2MnO_4$-MXene was 45 wt %, then the mixture was stirred in a constant-temperature water bath at 70° C. until the mixture was pasty, the pasty gel was taken out and placed on an axial press to be repeatedly and axially pressed into a sheet, the sheet was wrapped on foam nickel to be continuously and axially pressed until the sheet was nearly dry, then the sheet was rolled by a roller machine to obtain an electrode, the rolled electrode was placed in a constant-temperature drying oven at 40° C. for drying, cut into a circle with a diameter of 20 cm, and pressed and formed under a pressure of 20 MPa, then the electrode was roasted in a tubular furnace for 2 h under the protection of inert gas at 350° C., and the electrode was finally soaked in boiling water at 100° C. for 1 h, and taken out and dried for later use to obtain the ferrite-modified MXene layered gas diffusion electrode.

Embodiment 2 of Electrochemical Cathode:
Ferrite-Modified Carbon Fiber Cloth
Electrochemical Cathode 1) Original carbon fiber cloth was cut into a circle with a diameter of 10 cm, the carbon fiber cloth was soaked with a mixed solution of nitric acid with a mass percentage of 10% and a sulfuric acid solution with a mass percentage of 10% (a volume ratio of nitric acid to sulfuric acid was 3:1), the mixture was ultrasonically processed for 30 min, then the carbon fiber cloth was reacted for 24 h in a constant-temperature reaction kettle at 50° C., and washed with ultra-pure water for several times after the solution was cooled, surface residue impurities were removed until a pH of a cleaning solution was neutral, and then the carbon fiber cloth was fully dried in a vacuum oven at 50° C. until a constant mass was reached to obtain the modified carbon fiber cloth.

Figure 3:
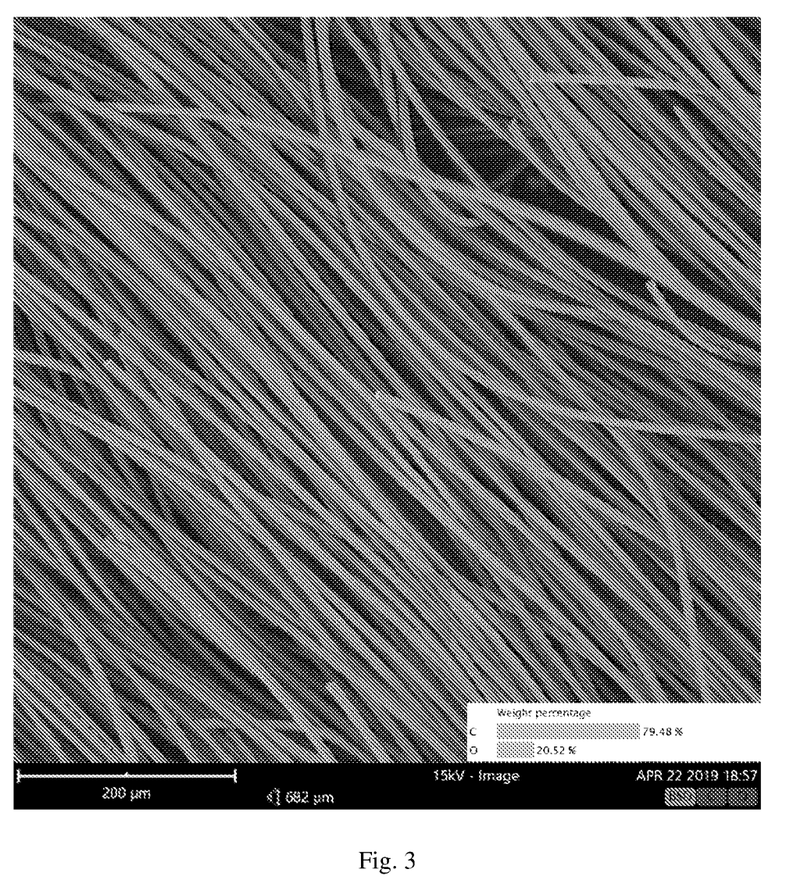
FIG. 3 illustrates a scanning electron microscope and energy spectrum of a modified carbon fiber cloth used in Embodiment 2.
Figure 4:
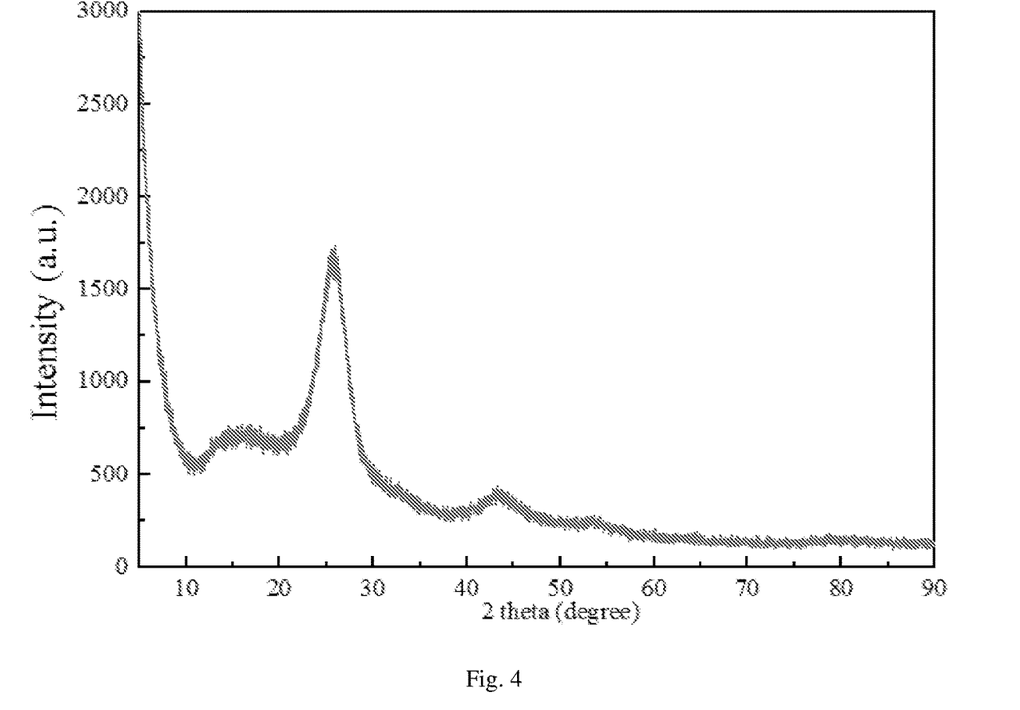
FIG. 4 is an X-Ray Diffraction graph of the modified carbon fiber cloth used Embodiment 2.

2) 0.8 mol/L $Fe(NO_3)_3 \cdot 9H_2O$ and 0.4 mol/L $Cu(NO_3)_2 \cdot 3H_2O$ were added into ultra-pure water, the mixture was ultrasonically processed for 1 h to evenly mix and completely dissolve the mixture to obtain a mixed solution, ammonium fluoride and urea were added into the mixed solution to stir continuously, then the modified carbon fiber cloth was added and stirred evenly, then the mixture was placed in a constant-temperature reaction kettle at 120° C. to react for 24 h, the washed ferrite-modified carbon fiber cloth was placed in a constant-temperature drying oven at 40° C. for drying after cooling, then the mixture was placed in a tubular electric furnace, inert gas was introduced as protective gas, and the mixture was roasted at 350° C. for 1 h and cooled to obtain the ferrite-modified carbon fiber cloth electrochemical cathode. FIG. 3 illustrates a scanning electron microscope and energy spectrum of the modified carbon fiber cloth used in the present invention. It can be seen from FIG. 3 that a defect is formed on a surface of the modified carbon cloth carbon fiber, which is beneficial to loading; the energy spectrum shows that an oxygen content of the material is increased. FIG. 4 is an XRD graph of the modified carbon fiber cloth used in the present invention. It can be seen from FIG. 4 that the carbon fiber has a C peak 2θ of 25.68°, a lattice spacing d of 0.346 nm, and a peak intensity of 724; the 2θ of the loaded metal oxide is 16.51°, 43.72° and 54.14° respectively; the corresponding d is 0.537 nm, 0.201 nm and 0.112 nm respectively, and the corresponding intensity is 701, 393 and 244 respectively.

Embodiment 3 of Electrochemical Cathode:
Carbonized MOFs Electrochemical Cathode 1) Preparation of MOFs: 105 mL of DMF was added after mixing 0.714 g of $COCl_2 \cdot 6H_2O$ and 0.498 g of terephthalic acid, then 7.5 mL of ethanol and water were slowly added respectively, magnetons were added, and the mixture was magnetically stirred for 1 h after sealing with a preservative film. After stirring, the mixed solution was transferred to a high-pressure reaction kettle and reacted in an oven at 120° C. for 12 h. After reaction, the reaction kettle was cooled in cold water, after the reaction kettle was cooled, the solid-liquid mixture in a lining was completely taken out and transferred to a clean beaker, ultra-pure water was added for cleaning, the beaker opening was sealed with a preservative film, the mixture was magnetically stirred for 3 h, the solution was centrifuged after stirring, the liquid part was discarded, the solid obtained by centrifugation was retained, the solid was transferred to another clean beaker, absolute ethyl alcohol was added for cleaning, the beaker opening was sealed with a preservative film, the mixture was magnetically stirred for 3 h, the solution was centrifuged again after stirring, and the solid obtained by centrifugation was dried, and grinded into even powder.

2) Carbonization of saturated MOFs: 0.5 g of the MOFs above was accurately placed in a 500 mL beaker, 50 mg/L (initial concentration of substance before reaction) cobalt nitrate and 50 mg/L (initial concentration of substance before reaction) polycyclic aromatic hydrocarbon POPs mixed solution were added into a round-bottom flask, then the round-bottom flask above was ultrasonically mixed for 2 h, and the mixture was centrifugally separated and dried after adsorbing for 2 days; and the mixture was placed in a porcelain boat to be heated at 600° C. with a heating rate of 2° C. and roasted for 1 h under the protection of nitrogen gas to carbonize the material, and the mixture was grinded after cooling, and sieved by a 200 mesh sieve for later use.

3) Preparation of electrochemical cathode: 0.3 g of the carbonized MOFs above, 0.45 g of anhydrous sodium sulfate and 0.33 g of acetylene black were accurately taken, a pipette gun was used to remove 0.389 mL of PTFE to be mixed with 2.5 mL of absolute ethyl alcohol, the mixture was manually stirred to mix the mixture evenly, and ultrasonically processed for 30 min to diffuse the PTFE into the system, then the mixture was magnetically stirred for 30 min to promote mixing, heated in a magnetically heated water bath kettle and magnetically stirred for 10 min, and ethanol was evaporated to make an electrode material be rubber-like; and foam nickel was cut, and the electrode material was wrapped on a surface of the foam nickel, and was axially pressed into a circle with a diameter of 10 cm. The wrapped electrode sheet was pressed with a small press at a pressure of 1 ton for 5 min, then the electrode sheet was sent to a tubular furnace, roasted at 350° C. for 1 h under the protection of nitrogen gas, and cooled and taken out for water bath at 90° C. for 1 h, and sodium sulfate in the electrode was washed out to obtain the carbonized MOFs electrochemical cathode.

Figure 5:
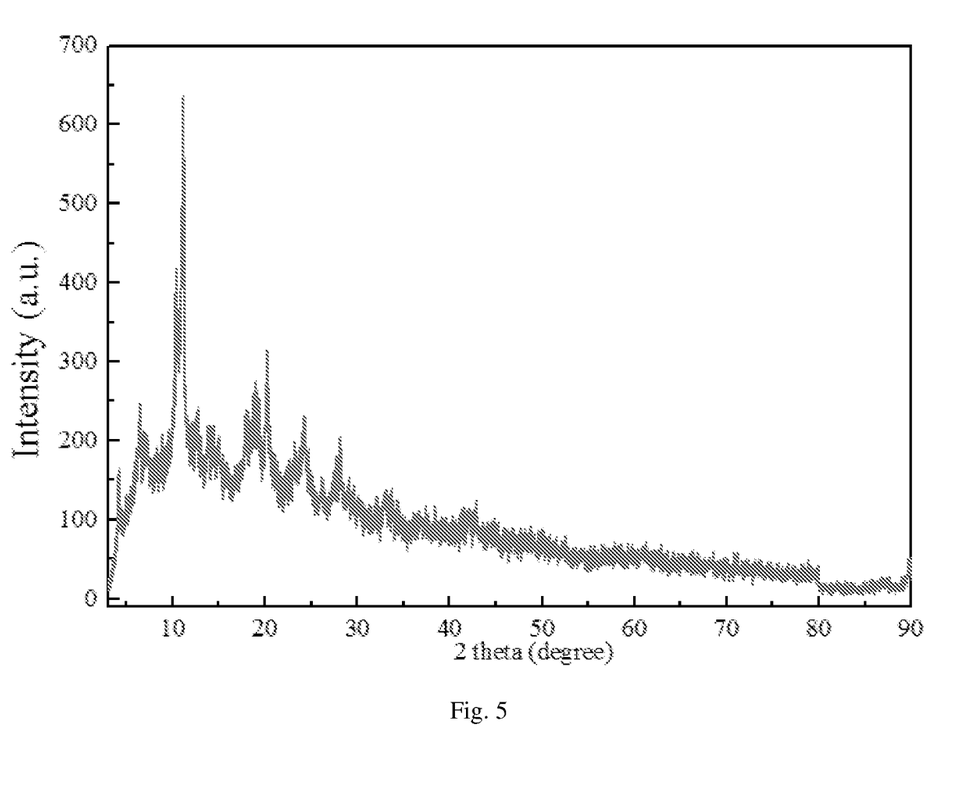
FIG. 5 is an XRD graph of MOFs used in Embodiment 3.
Figure 6:
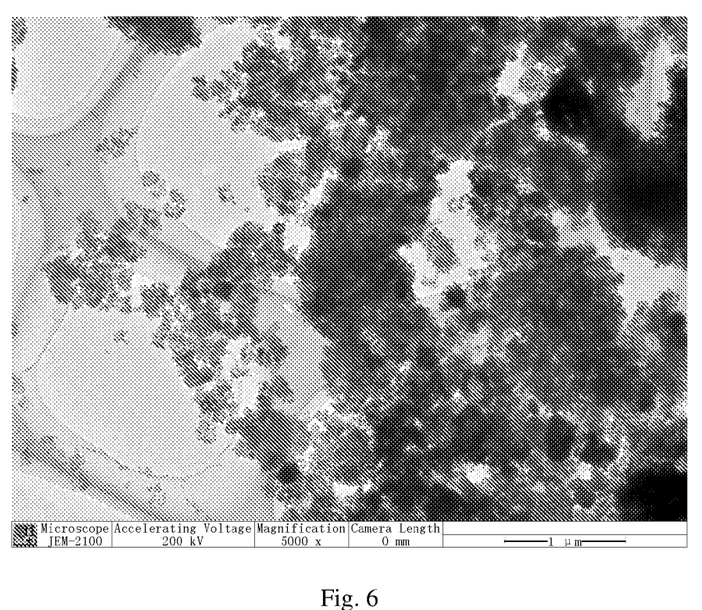
FIG. 6 is a transmission electron microscope of the carbonized MOFs used in Embodiment 3.

FIG. 5 is an XRD graph of MOFs used in the present invention. It can be seen from FIG. 5 that the $2\theta$ of the MOFs is 11.46°, 18.96°, 20.17°, 24.09° and 28.01° respectively; the corresponding lattice spacing d is 0.771 nm, 0.469 nm, 0.440 nm, 0.369 nm and 0.318 nm respectively, and the corresponding intensity is 622, 250, 306, 221 and 176 respectively. FIG. 6 is a transmission electron microscope of the carbonized MOFs used in the present invention. It can be seen from FIG. 6 that the MOFs have been successfully carbonized, and the material is in powder form and evenly dispersed.

Embodiment 4 of Three-Dimensional Particle Electrode: In-Situ Growing MOFs Nano-Material of Magnetic Carbon Material 1) Removal of impurities from carbon material: 2 g of graphene oxide was accurately placed in a 250 mL round-bottom flask, 100 mL of 65% concentrated nitric acid was added into the round-bottom flask, then the round-bottom flask was ultrasonically mixed for 2 h, the mixed solution evenly mixed was placed into a polytetrafluoroethylene-lined constant-temperature reaction kettle, and the reaction kettle was placed into an electric heating constant-temperature drying oven for reaction for 3 h at 120° C. The solution was filtered after cooling, a filter cake was washed with ultra-pure water for many times until a last filter liquid was neutral, and acidified CNTs washed to neutrality was finally dried in an electric heating constant-temperature drying oven at 60° C. for 24 h, and grinded for later use.

2) Magnetic loading: 1 g of acidified graphene oxide was added into a 250 mL round-bottom flask, then 50 ml of mixed solution of 0.02 mol/L $Fe(NO_3)_3$ and 0.01 mol/L $Co(NO_3)_2$ was added for ultrasonic mixing for 30 min, and then the ultrasonically processed mixed solution was reacted in a constant-temperature magnetic stirrer at 60° C. for 12 h at a rotating speed of 4 rpm. The reacted solution above was cooled to a room temperature, and filtered through qualitative filter paper, a filter cake was washed until a last filter liquid was neutral, and then an adsorbent washed to neutrality was placed in an electric heating constant-temperature drying oven at 60° C. to be dried for 6 h, and grinded for later use. The adsorbent grinded to powder was subsequently placed in a quartz crucible without a cover, and then the adsorbent was evenly spread and placed in a vacuum tubular electric furnace with $N_2$ as a protective gas flow. The adsorbent was heated to 600° C. at a heating rate of 3° C./min, the constant temperature was kept for 3 h, and the adsorbent was grinded after cooling for later use.

3) Preparation of adsorption-catalysis complex: 1.8 g of $Al(NO_3)_3 \cdot 9H_2O$ was dissolved in 28 mL of dimethylformamide DMF solution, then 5.6 mL of formic acid was added, the mixture was stirred for 20 min while 1 g of the magnetic carbon material above was added, then the mixture was mechanically stirred at 50° C. for 30 min after sealing with a preservative film, and the mixed solution was transferred to a high-pressure reaction kettle, and reacted in an oven at 130° C. for 8 h. After reaction, the reaction kettle was cooled in cold water, after the reaction kettle was cooled, the solid-liquid mixture in a lining was completely taken out and transferred to a clean beaker, ultra-pure water was added for cleaning, the beaker opening was sealed with a preservative film, the mixture was mechanically stirred for 2 h, the solution was centrifuged after stirring, the liquid part was discarded, the solid obtained by centrifugation was retained, the solid was transferred to another clean beaker, absolute ethyl alcohol was added for cleaning, the beaker opening was sealed with a preservative film, the mixture was mechanically stirred for 3 h, the solution was centrifuged again after stirring, and the solid obtained by centrifugation was dried, and grinded into even powder to obtain the in-situ growing MOFs nano-material of the magnetic carbon material.

Figure 7:
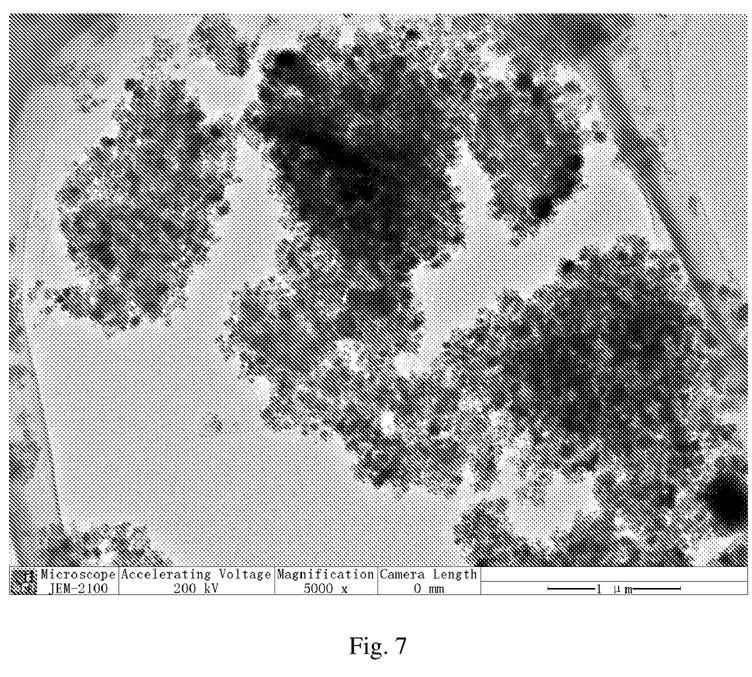
FIG. 7 is a transmission electron microscope of an in-situ growing MOFs nano-material of a magnetic carbon material used in Embodiment 4.
Figure 8:
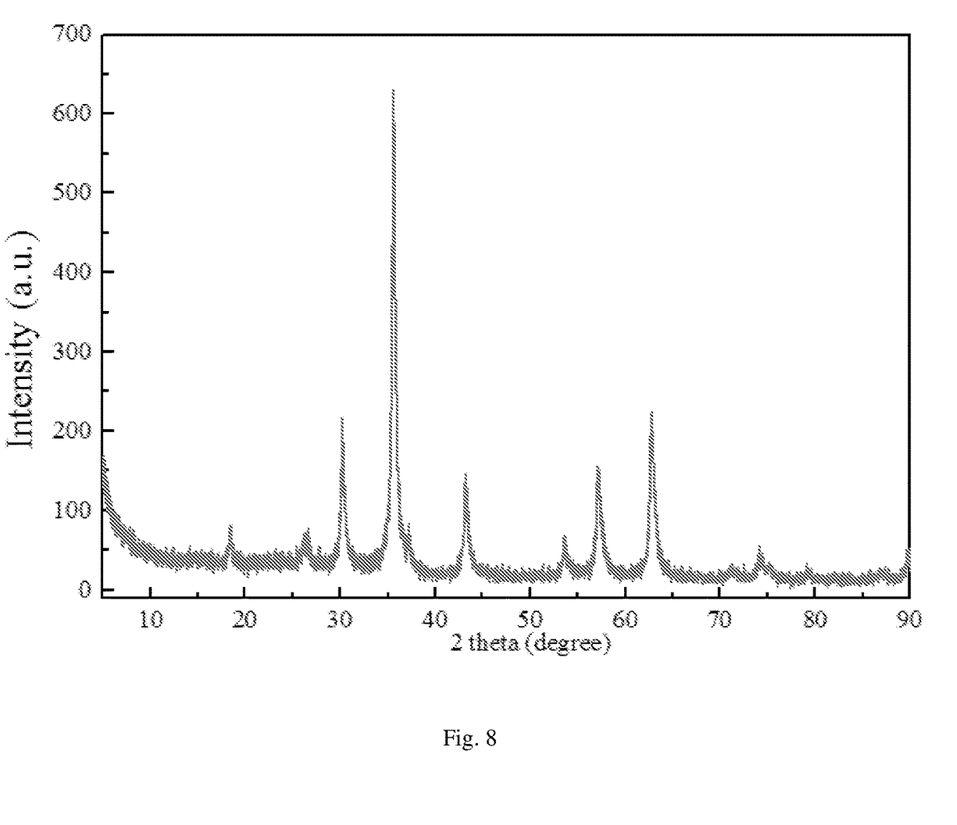
FIG. 8 is an XRD graph of the in-situ growing MOFs nano-material of the magnetic carbon material used in Embodiment 4.

FIG. 7 is a transmission electron microscope of an in-situ growing MOFs nano-material of a magnetic carbon material used in the present invention. It can be seen from the drawing that magnetic nano-particles are in regular crystal morphology with a particle size of 20 nm to 50 nm, and evenly loaded on a surface of the in-situ growing MOFs nano-material of the carbon material, the material has a particle size mainly between 10 nm to 100 nm, the material has a fine particle size on the surface and is evenly dispersed. FIG. 8 is an XRD graph of the in-situ growing MOFs nano-material of the magnetic carbon material used in the present invention. It can be seen from the drawing that the material has a C peak $2\theta$ of 30.18°, a lattice spacing d of 0.292 nm, and a peak intensity of 203; the $2\theta$ of the loaded magnetic material is 18.27°, 35.59°, 43.31°, 53.60°, 57.75° and 62.67° respectively; the corresponding lattice spacing d is 0.485 nm, 0.252 nm, 0.209 nm, 0.171 nm, 0.161 nm and 0.148 nm respectively, and the corresponding intensity is 68, 621, 128, 55, 148 and 212 respectively.

Purification of Domestic Sewage with the Electrocatalytic Ozone and the Ferrate in Embodiment 1

Embodiments 1, 2 and 4 were applied in the purification of the domestic sewage.

Under the conditions of 25° C. and a pH of 7, a solution volume was 1 L, concentrations of 20 drugs and personal care products were 20 mg/L, a sodium sulfate concentration was 0.1 mol/L, an odor flow rate was 100 mL/min, a gas phase ozone concentration was 50 mg/L, a rotating speed of a peristaltic pump was 50 rpm, and a cathode current density was 50 mA/cm$^2$. A ferrite-modified MXene layered gas diffusion electrode and a carbonized MOFs electrochemical cathode were respectively used as a modified electrochemical cathode, a stainless steel mesh was used as an electrochemical anode, and the in-situ growing MOFs nano-material of the magnetic carbon material in Embodiment 4 was used as a three-dimensional particle electrode, wherein an adding amount was 0.5 g, an adding concentration of potassium ferrate was 30 mmol/L, and a removal time was 20 min.

During reaction, a liquid phase ozone concentration was measured and compared with ordinary aeration, and it was found that the liquid phase ozone concentration was greatly increased (Table 1). The BOD value was reduced to 1 mg/L, and the Total Organic Carbon was reduced to 2 mg/L in 10 min, and the removal rates were 99% and 96% (Table 2).

TABLE 1

Comparison of Liquid Ozone Concentrations Measured in Water with Ordinary Aeration and Micro-nano Aeration Disk Aeration in Embodiment 1

| Aeration time (min) | Ozone concentration of ordinary aeration (mg/L) | Ozone concentration of micro-nano aeration disk aeration (mg/L) |
|---|---|---|
| 2 | 5.4 | 17.2 |
| 4 | 10.5 | 33.5 |
| 6 | 21.2 | 54.9 |
| 8 | 30.5 | 61.1 |
| 10 | 47.0 | 73.0 |

TABLE 2

Removal of BOD and TOC in Embodiment 1

| Aeration time (min) | BOD value (mg/L) | TOC value (mg/L) |
|---|---|---|
| 2 | 80.3 | 40.1 |
| 4 | 60.2 | 29.3 |
| 6 | 41.5 | 18.9 |
| 8 | 20.9 | 11.2 |
| 10 | 1.0 | 2.0 |

Degradation of Laboratory Organic Wastewater with the Electrocatalytic Ozone and the Ferrate in Embodiment 2

Embodiments 1, 3 and 4 were applied in degradation of laboratory organic wastewater.

Under the conditions of 25° C. and pH=7, a solution volume is 1 L, concentrations of 20 drugs and personal care products are 20 mg/L, a sodium sulfate concentration is 0.1 mol/L, an odor flow rate is 100 mL/min, a gas phase ozone concentration is 50 mg/L, a rotating speed of a peristaltic pump is 50 rpm, and a cathode current density is 50 mA/cm$^2$. A modified electrochemical cathode is respectively a ferrite-modified MXene layered gas diffusion electrode and a carbonized MOFs electrochemical cathode, an electrochemical anode is a stainless steel mesh, a three-dimensional particle electrode is the in-situ growing MOFs nano-material of the magnetic carbon material in the fourth embodiment, with an adding amount of 0.5 g, and an adding concentration of potassium ferrate is 30 mmol/L, with a removal time of 20 min. A concentration of organic matters in a reaction process was measured by gas chromatography, an initial point concentration was Co, a sample was taken at a time point of 20 min, a measured concentration was C, and removal rates were summarized in Table 3.

TABLE 3

Removal Rates of 20 Substances in Embodiment 2

| Substance name | Removal rate | Substance name | Removal rate |
|---|---|---|---|
| Trimethoprim | 96.2% | Enrofloxacin | 95.7% |
| Amoxicillin | 95.4% | Ofloxacin | 96.2% |
| Erythromycin | 94.9% | Norfloxacin | 95.4% |
| Indomethacin | 96.2% | Flumequine | 94.7% |
| Antipyrine | 96.0% | Clarithromycin | 95.7% |
| Sulfathiazole | 95.9% | Azithromycin | 96.2% |
| Sulfamerazine | 95.2% | Chlorotetracycline | 96.0% |
| Sulfamethazine | 94.9% | Oxytetracycline | 95.9% |
| Sulfamethoxazole | 96.2% | Tetracycline | 96.2% |
| Sulfadiazine | 96.2% | Doxycycline | 95.8% |

The invention can be better understood according to the embodiments above. However, those skilled in the art can understand that the specific process conditions and results described in the embodiments are only used to illustrate the invention, which shall not and will not limit the protection scope of the claims.

What is claimed is:

1. A device for treating sewage, comprising a treatment tank, a power and electric control unit, a gas supply and tail gas recovery unit, an external circulating device for making water circulation and a reaction treatment element, wherein the treatment tank is provided with a liquid inlet (30), a liquid outlet (18), a gas intake port and a tail gas exhaust port; the gas supply and tail gas recovery unit is communicated with the treatment tank through the gas intake port; the tail gas exhaust port is communicated with the gas supply and tail gas recovery unit; the reaction treatment element is arranged inside the treatment tank; the external circulating device is arranged outside the treatment tank and is communicated with the liquid inlet (30) and the liquid outlet (18) respectively; the power and electric control unit is connected with the reaction treatment element; and sewage to be processed enters the treatment tank through the liquid inlet (30) and reacts with ferrites in the reaction treatment element;

wherein the power and electric control unit comprises a wind power generator (1), a solar panel (2), a Uninterruptible Power Supply (3), a constant current meter (4), a first electrode switch (5), a second electrode switch (6) and a third electrode switch (7); the gas supply and tail gas recovery unit comprises an oxygen carrier (11), an ozone generator (10), a tail gas exhaust valve (25) and a tail gas absorption device (26); the external circulating device a liquid flowmeter (31) and a peristaltic pump (32); and the reaction treatment element comprises a micro-nano aeration disk, an electrochemical cathode, a three-dimensional particle electrode and an electrochemical anode.

2. The device according to claim 1, wherein the micro-nano aeration disk, the electrochemical cathode, the three-dimensional particle electrode and the electrochemical anode are arranged in the treatment tank from front to back in sequence; the power and electric control unit is respectively connected with the electrochemical cathode and the electrochemical anode; the gas intake port is communicated with the treatment tank and is connected with the micro-nano aeration disk; and a persulfate layer is filled between the electrochemical cathode and the electrochemical anode.

3. The device according to claim 2, wherein the electrochemical cathode is selected from the group consisting of a ferrite-modified Mxene layered gas diffusion electrode and a ferrite-modified carbon fiber cloth electrochemical cathode; the three-dimensional particle electrode is an electrode formed by an in-situ growing MOFs nano-material of a magnetic carbon material;

and the electrochemical anode is a stainless steel mesh electrode, a platinum mesh electrode and/or a titanium mesh electrode.

4. The device according to claim 3, wherein the micro-nano aeration disk discharges micro-nano bubbles and the micro-nanobubbles have a size of 200 nm to 500 nm.

5. The device according to claim 4, wherein the peristaltic pump (32) is communicated with the liquid inlet (30) on the treatment tank through the liquid flowmeter (31); and the liquid outlet (18) on the treatment tank is communicated with the peristaltic pump (32).

6. The device according to claim 5, wherein the oxygen carrier (11) is communicated with the treatment tank through the ozone generator (10) and the gas intake port in sequence; the oxygen carrier (11) is communicated with the treatment tank through the gas intake port; and the tail gas exhaust port is communicated with the tail gas absorption device (26) through the tail gas exhaust valve (25).

7. The device according to claim 6, wherein the wind power generator (1) is connected with the Uninterruptible Power Supply (UPS) (3) through the solar panel (2); the UPS (3) is respectively connected with the first electrode switch (5) and the second electrode switch (6) through the constant current meter (4); and the first electrode switch (5) and the second electrode switch (6) are respectively connected with the reaction treatment element arranged inside the treatment tank.

* * * * *